United States Patent [19]

Mikawa

[11] Patent Number: 4,464,444

[45] Date of Patent: Aug. 7, 1984

[54] FUEL CELL POWER GENERATION SYSTEM AND METHOD OF OPERATING THE SAME

[75] Inventor: Hiroji Mikawa, Tohkai, Japan

[73] Assignee: Hitachi, Ltd., Tokyo, Japan

[21] Appl. No.: 403,011

[22] Filed: Jul. 29, 1982

[30] Foreign Application Priority Data

Aug. 3, 1981 [JP] Japan ................. 56-120786

[51] Int. Cl.$^3$ .................. H01M 8/04; H01M 8/06
[52] U.S. Cl. ...................... 429/13; 429/17; 429/24
[58] Field of Search ............ 429/17, 26, 24, 20, 429/13

[56] References Cited

U.S. PATENT DOCUMENTS 3,336,162 8/1967 Zachmann ............... 429/26
4,041,210 8/1977 Van Dine ................. 429/17

Primary Examiner—Donald L. Walton
Attorney, Agent, or Firm—Antonelli, Terry & Wands

[57] ABSTRACT

A fuel cell power generation system in which the temperature of fuel cells is held constant irrespective of the load level of the cells, and waste energy is effectively recovered, that is, heat generated by fuel cells or a hydrogen producing device is temporarily stored, thereby to absorb the fluctuations of generated heat attendant upon the load fluctuation of the fuel cells and also to generate steam required in the hydrogen producing device by the use of the stored heat. When the heat generated by the cells is little as in a low load operation or a stand-by state, the stored heat is used for heating so as to allow power to be generated immediately upon a load demand.

7 Claims, 2 Drawing Figures

FUEL CELL POWER GENERATION SYSTEM AND METHOD OF OPERATING THE SAME

BACKGROUND OF THE INVENTION

The present invention relates to a fuel cell power generation system.

Since fuel cells have a high power generation efficiency, they will be soon adopted in future power plants, and concrete expedients for making use of the features of them have been proposed. Some of the proposals enhance the overall efficiencies of fuel cell power generation systems. In, for example, Japanese Laid-open Patent Application No. 51-104539, a turbocharger is driven by waste energy generated within a power plant, and a pressurized gas is used, whereby the efficiencies of a fuel reformer and fuel cells are enhanced. In Japanese Laid-open Patent Application No. 51-104540, steam produced by a cathode is directly used as steam for reformation. In addition, in Japanese Laid-open Patent Application No. 51-104541, steam is generated by the exchange of heat with cells or a shift converter, while waste heat is utilized as heat necessary for the vaporization of water. There are also a proposal as in Japanese Laid-open Patent Application No. 53-29534 wherein steam is generated by the waste heats of a fuel processing device, fuel cell cathodes and a turbocharger so as to drive a turbo-generator, and one as in Japanese Laid-open Patent Application No. 54-82636 wherein the structure of a hydrogen producing device is improved to enhance the thermal efficiency.

Although these power plants have numerous advantages, they are unsatisfactory as the whole. For example, in order to hold the performance of the fuel cells, it is important to control the temperature of the cells to be constant during stand-by or irrespective of the magnitude of a load. Nevertheless, this is not taken into account or necessitates a systematically delicate control in the foregoing power plants.

SUMMARY OF THE INVENTION

An object of the present invention is to provide a fuel cell power generation system in which the temperature of fuel cells is held constant irrespective of the load level of the cells, and waste energy is effectively recovered, thereby to improve the power generation efficiency.

In the present invention, heat generated by fuel cells or a hydrogen producing device is temporarily stored, thereby to absorb the fluctuations of generated heat attendant upon the load fluctuations of the fuel cells and also to generate steam required in the hydrogen producing device by the use of the stored heat. When the heat generated by the cells is little as in a low load operation or a stand-by state, the stored heat is used for heating so as to allow power to be generated immediately upon a load demand.

DESCRIPTION OF THE PREFERRED EMBODIMENTS

Figure 1:
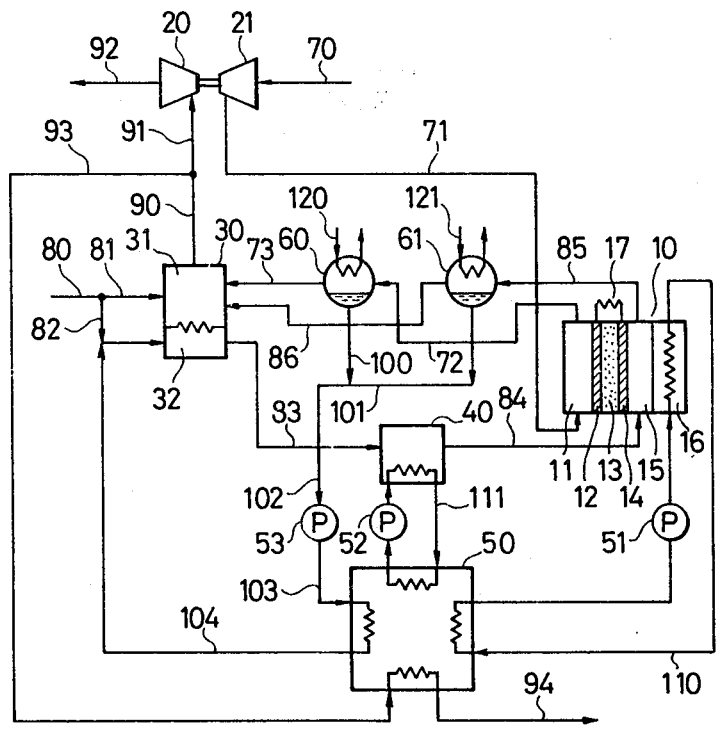
FIG. 1 is a system diagram showing an example of a fuel cell power generation system to which the present invention is applied.

Hereunder, an embodiment of the present invention will be described with reference to FIG. 1. The arrangement of FIG. 1 includes a fuel cell 10, a turbine 20, an air compressor 21, a reformer 30, a shift converter 40, a heat accumulator 50, and condensers 60 and 61.

The fuel cell 10 includes a cathode chamber 11, a cathode 12, an electrolyte 13, an anode 14, an anode chamber 15 and a cooling portion 16. In general, a plurality of fuel cells are electrically connected, but they are depicted as the single cell in FIG. 1. A proper load 17 is connected across the cathode 12 and the anode 14.

The fuel cell shown in FIG. 1 is of the oxygen-hydrogen type, which obtains oxygen from the air and obtains hydrogen by reforming a fuel containing carbon, with steam.

The reformer 30 is constructed of a burner 31 and a reaction chamber 32, and if necessary, the reaction chamber 32 is filled with a catalyst.

The shift converter 40 is filled with a catalyst, and is equipped with a heat exchanger for taking out reaction heat.

The heat accumulator 50 is equipped with a plurality of heat exchangers, and is filled with a heat storing medium.

Now, the method of operation according to the present invention will be described.

The fuel such as naphtha and methane, and steam for reformation are supplied from lines or conduits 82 and 104, and are fed to the reaction chamber 32 of the reformer 30. Here, the fuel is reformed into a hydrogen-rich gas 83. In the shift converter 40, carbon monoxide produced in the reformer reacts with the steam, to be converted into hydrogen and carbonic acid gas. The hydrogen is supplied from a line 84 into the anode chamber 15 of the fuel cell 10.

On the other hand, the air is compressed up to a predetermined pressure by the compressor 21 and is supplied via line 71 into the cathode chamber 11 of the fuel cell 10. A voltage is generated across the cathode 12 and the anode 14 by an electrochemical reaction in the fuel cell, and electric power is derived by the load 17. When the load is connected, the hydrogen of the anode chamber is consumed, and water is produced in the cathode chamber. Usually, the fuel cell is supplied with the fuel and the air more than are consumed therein, so as to emit gases from the cell, and the produced water is taken out of the cell. The emitted gases 72 and 85 are supplied to the condensers 60 and 61, in which the water contents are condensed. The gases enter the burner 31 of the reformer 30 through lines 86 and 73, and are burnt.

Part of the heat of the combustion gas is afforded to the reaction chamber 32, and is utilized for the reformation reaction described above. In addition, part of the combustion gas 90 is supplied to the gas turbine 20 so as to reclaim waste energy. The gas turbine 20 drives the air compressor 21. The other part of the combustion gas 90 is supplied to the heat exchanger of the heat accumulator 50 so as to store the waste energy in the heat accumulator 50.

Reaction heat in the shift converter 40 is taken out by a heat medium kept circulating by a pump 52, and is stored in the heat accumulator 50.

When current is caused to flow by connecting the load 17 to the fuel cell 10, it generates heat due to joule loss within the fuel cell. Since the generated heat tends to raise the temperature of the cell, a heat medium 110 is caused to flow through the cooling portion 16 so as to take out the heat and afford it to the heat accumulator. The heat medium 110 is circulated by a pump 51.

The water components 100 and 101 condensed by the condensers 60 and 61 are supplied to the heat exchanger of the heat accumulator 50 by the pump 53, and become the steam in line 104 here. The steam is supplied to the reformer reaction chamber 32.

When the quantity of heat generation in the fuel cell 10 is small as in a low load operation or stand-by operation, the heat stored in the heat accumulator 50 is afforded to the fuel cell by the heat medium 110 so as to raise the temperature of the cell. Also the temperature of the shift converter 40 is raised by a heat medium 111.

The temperature of the heat accumulator 50 is determined by the thermal balance of the fuel cell 10, shift converter 40, combustion gas 93, and condensed water 103. The temperature of the heat accumulator is therefore controlled by increasing or decreasing the flow rate of the combustion gas 93. In a case where the load has fluctuated, for example, where it has lowered, (1) the quantity of heat generation by the fuel cell 10 decreases.
(2) With decrease in the fuel flow rate 84, the quantity of heat generation by the shift converter 40 decreases.
(3) With decrease in the steam flow rate in line 104, the quantity of vaporized fuel decreases.
(4) While the temperature of the heat accumulator 50 is held substantially constant by the above items (1)–(3), fine adjustments are made by the flow rate of the combustion gas 93.

At starting, the heat accumulator 50 is preheated by the combustion gas 93, and the temperatures of the fuel cell 10 and the shift converter 40 are raised by the heat media 110 and 111. Since this operation can be carried out prior to the connection of the load to the cell, the temperatures of the cell and the shift converter are sufficiently raised at the point of time of a load demand, so that power can be immediately generated.

Figure 2:
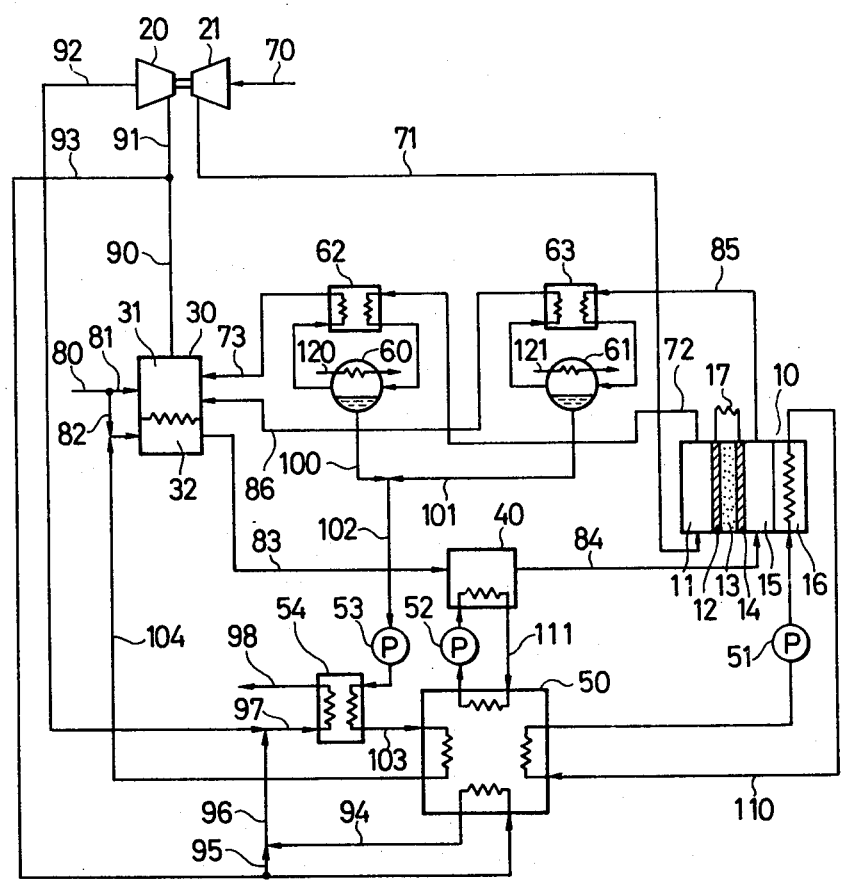
FIG. 2 is a diagram showing another embodiment of the present invention.

FIG. 2 shows another embodiment of the present invention. The arrangement of FIG. 2 has further improved the system of FIG. 1. The condensers 60 and 61 are additionally provided with heat exchangers 62 and 63 for outlet and inlet gases. Further, a heat exchanger 54 which recovers the heat of the exhaust gas 92 of the gas turbine 20 as well as the outlet exhaust gas 94 of the heat accumulator is additionally disposed. The outlet gases of the condensers 60 and 61 are heated through heat exchanges with the emission gases 72 and 85 of the fuel cell at high temperatures, and then supplied to the burner 31 of the reformer 30. The waste heats of the exhaust gas 92 of the gas turbine 20 and the outlet exhaust gas 94 of the heat accumulator preheat the condensed water 102, and if necessary, the preheating temperature is controlled by varying the flow rates of both the gases.

By additionally disposing the heat exchangers in this manner, the waste heats can be recovered to enhance the thermal efficiency. The propriety of the addition of the heat exchangers is often decided in consideration of the installation cost and the running cost, and various applications are thought out.

While, in the above, the present invention has been described in detail in conjunction with the specific embodiments thereof, it is obvious to one engaged in the art that the present invention is not restricted to the foregoing embodiments but that various applications are possible within the scope of the present invention.

According to the present invention, the temperature of fuel cells can be held constant irrespective of the load level of the cells. Therefore, not only required power can be immediately generated upon a load demand, but also the performance of the cells can be held constant and the lifetime thereof can be prolonged owing to reduced thermal shocks. Further, since waste energy can be effectively recovered, the power generation efficiency is improved.

What is claimed is:

1. In a fuel cell power plant having fuel cells each of which has a cathode and an anode, a device which supplies air to the cathodes of the cells, and a device which produces hydrogen by a reaction between fuel and steam and which supplies the produced hydrogen to the anodes of the cells, combustion energy of an unreacted gas of the cells being afforded to the hydrogen producing device and the air supplying device; a fuel cell power plant characterized by comprising first means for condensing and re-vaporizing water contents contained in gases emitted from said cathodes and anodes and then supplying the steam to said hydrogen producing device, second means for temporarily accumulating heat generated by said fuel cells, and third means for using the heat accumulated by said second means, in order to vaporize the water in said first means.

2. A fuel cell power plant as defined in claim 1, further comprising means for temporarily accumulating generated heat in said hydrogen producing device, and means for temporarily accumulating part of the combustion energy of the unreacted gas of said fuel cells, heat obtainable from both the heat accumulating means being used in order to vaporize the water in said first means.

3. In a method of operating a fuel cell power plant which includes fuel cells, a combustion gas producing device, a heat accumulator, a device for receiving and delivering heat for the heat accumulator, and a device for generating steam to be supplied to a hydrogen producing device; said method comprising the steps of storing, during a fuel cell operation mode, the heat generated by the cells in the heat accumulator, and supplying, during a starting mode and a stand-by mode, the heat of the heat accumulator to the fuel cells.

4. A method of operating a fuel cell power plant according to claim 3, wherein said method further includes the step of controlling a temperature of the heat accumulator by a flow rate of an exhaust gas from the combustion gas producing device.

5. A method of operating a fuel cell power plant according to claim 3, further comprising the step of controlling a preheating temperature of water to be supplied to the hydrogen producing device by a flow rate of an exhaust gas from the combustion gas producing device.

6. A fuel cell power plant according to claim 1, wherein said device which produces hydrogen includes a combustion gas producing device, said apparatus further comprising means for controlling a temperature of the heat accumulator by a flow rate of an exhaust gas from the combustion gas producing device.

7. A fuel cell power plant according to claim 1, wherein said device which produces hydrogen includes a combustion gas producing device, said apparatus further comprising means for controlling a preheating temperature of water to be supplied to the hydrogen producing device by a flow rate of an exhaust gas from the combustion gas producing device.

* * * * *